United States Patent
Henderson-Rutgers et al.

(10) Patent No.: US 7,854,994 B2
(45) Date of Patent: *Dec. 21, 2010

(54) BARRIER FILM

(75) Inventors: Rulande Henderson-Rutgers, Portland, OR (US); Mark Fink, Armadale (AU); Nicholas Roy Oakley, Lara (AU)

(73) Assignee: Plantic Technologies Ltd., Altona, Victoria (AU)

( * ) Notice: Subject to any disclaimer, the term of this patent is extended or adjusted under 35 U.S.C. 154(b) by 550 days.

This patent is subject to a terminal disclaimer.

(21) Appl. No.: 11/665,477

(22) PCT Filed: Oct. 18, 2005

(86) PCT No.: PCT/AU2005/001605
§ 371 (c)(1),
(2), (4) Date: Jul. 27, 2007

(87) PCT Pub. No.: WO2006/042364
PCT Pub. Date: Apr. 27, 2006

(65) Prior Publication Data
US 2009/0110942 A1 Apr. 30, 2009

(30) Foreign Application Priority Data
Oct. 18, 2004 (AU) .............................. 2004905987

(51) Int. Cl.
*C08L 3/00* (2006.01)
*B32B 27/18* (2006.01)
*B32B 27/22* (2006.01)
*B32B 27/30* (2006.01)
*B32B 27/36* (2006.01)

(52) U.S. Cl. ...................... 428/480; 428/532; 524/47; 524/48; 524/49; 524/50; 524/51; 524/52; 524/53; 524/284; 525/54.3; 525/54.31; 525/56; 525/58

(58) Field of Classification Search .................. None
See application file for complete search history.

(56) References Cited

U.S. PATENT DOCUMENTS 5,087,650 A * 2/1992 Willett ........................ 524/47

(Continued)

FOREIGN PATENT DOCUMENTS

EP 0 400 532 * 5/1989

(Continued)

OTHER PUBLICATIONS

International Search Report and Written Opinion of PCT/AU2005/001605, mailed Dec. 12, 2005, seven pages.

(Continued)

*Primary Examiner*—Vivian Chen
(74) *Attorney, Agent, or Firm*—Kilyk & Bowersox, P.L.L.C.

(57) ABSTRACT

A barrier composition which is injection mouldable and able to be made into a transparent film or incorporated (by co-extrusion and/or lamination) into multi-layer film products, the composition on dry basis: a) from 45 to 90% by weight of a starch and/or a modified starch selected from starches modified by reaction with a hydroxyl alkyl group, an acetate or a dicarboxylic acid anhydride or a grafting polymer; b) from 4 to 12% by weight of a water soluble polymer selected from polyvinyl alcohol, polyvinylacetate, and copolymers of ethylene and vinylalcohol which have a melting point compatible with the molten state of the starch components c) from 5 to 45% by weight of a non-crystallising mixture of sorbitol and at least one other plasticizer selected from glycerol, maltitol, xylitol, mannitol, glycerol trioleate, epoxidised linseed or soybean oil, tributyl citrate, acetyl tri-ethyl citrate, glyceryl triacetate, 2,2,4-trimethyl-1,3-pentanediol diisobutyrate; polyethylene oxide or polyethylene glycol; d) from 0.3 to 2.5% by weight of a C12-22 fatty acid or salt; e) from 0.25% to 3% of an emulsifier system having a hydrophilic lipophilic balance value between 2 and 10. The barrier film may be co-injection moulded with polyethylene terephthalate (PET) or polylactic acid (PLA) for blow moulding into beverage bottles, with polyethylene (PE) or polypropylene (PP) or biodegradable polymers for high gas-barrier containers or closures, or may be co-extruded with polyethylene, polypropylene or polylactic acid for thin film packaging applications or for blow-moulded containers.

13 Claims, 2 Drawing Sheets

U.S. PATENT DOCUMENTS

| | | | |
|---|---|---|---|
| 5,095,054 A * | 3/1992 | Lay et al. | 524/47 |
| 5,106,890 A * | 4/1992 | Maruhashi et al. | 524/47 |
| 5,275,774 A | 1/1994 | Bahr et al. | |
| 5,288,765 A * | 2/1994 | Bastioli et al. | 521/84.1 |
| 5,292,782 A * | 3/1994 | Bastioli et al. | 524/47 |
| 5,314,754 A | 5/1994 | Knight | |
| 5,322,866 A * | 6/1994 | Mayer et al. | 524/47 |
| 5,360,473 A | 11/1994 | Fleche et al. | |
| 5,362,777 A * | 11/1994 | Tomka | 524/47 |
| 5,367,067 A * | 11/1994 | Frische et al. | 536/45 |
| 5,374,304 A * | 12/1994 | Frische et al. | 106/206.1 |
| 5,384,187 A * | 1/1995 | Uemura et al. | 442/59 |
| 5,409,751 A * | 4/1995 | Suzuki et al. | 428/36.9 |
| 5,409,973 A * | 4/1995 | Bastioli et al. | 524/53 |
| 5,412,005 A * | 5/1995 | Bastioli et al. | 524/47 |
| 5,462,982 A * | 10/1995 | Bastioli et al. | 524/47 |
| 5,498,662 A * | 3/1996 | Tanaka et al. | 525/54.2 |
| 5,512,378 A * | 4/1996 | Bastioli et al. | 428/484.1 |
| 5,621,026 A | 4/1997 | Tanaka et al. | |
| 5,629,003 A | 5/1997 | Horstmann et al. | |
| 5,691,403 A * | 11/1997 | Shitaohzono et al. | 524/47 |
| 5,897,960 A * | 4/1999 | Oba et al. | 428/532 |
| 6,143,384 A | 11/2000 | Tanaka et al. | |
| 6,231,970 B1 * | 5/2001 | Andersen et al. | 428/332 |
| 6,248,430 B1 * | 6/2001 | Toyoda et al. | 428/213 |
| 6,528,088 B1 * | 3/2003 | Gilleland et al. | 424/451 |
| 6,569,539 B2 | 5/2003 | Bentmar et al. | |
| 6,673,403 B1 * | 1/2004 | Shiiki et al. | 428/35.7 |
| 6,692,801 B1 | 2/2004 | Berlin et al. | |
| 6,821,590 B2 * | 11/2004 | Verrall et al. | 428/35.7 |
| 6,911,255 B2 * | 6/2005 | Posey et al. | 428/336 |
| 7,005,168 B2 * | 2/2006 | Verrall et al. | 428/35.7 |
| 7,072,248 B2 * | 7/2006 | Gohil | 368/327 |
| 7,176,251 B1 * | 2/2007 | Bastioli et al. | 524/47 |
| 7,326,743 B2 * | 2/2008 | Yu et al. | 524/47 |
| 2002/0034549 A1 * | 3/2002 | Becker et al. | 424/489 |
| 2004/0242732 A1 * | 12/2004 | Yu et al. | 524/50 |
| 2006/0260973 A1 * | 11/2006 | Macinnes et al. | 206/528 |
| 2007/0042207 A1 * | 2/2007 | Berger et al. | 428/480 |
| 2007/0276317 A1 * | 11/2007 | Henderson et al. | 604/15 |
| 2009/0312462 A1 * | 12/2009 | Oakley et al. | 524/47 |

FOREIGN PATENT DOCUMENTS

| | | | |
|---|---|---|---|
| JP | 56-014544 | * | 2/1981 |
| JP | 06-073259 | * | 3/1994 |
| JP | 11-130907 A | | 5/1999 |
| WO | WO 00/36006 | * | 6/2000 |
| WO | WO 00/49072 A1 | | 8/2000 |
| WO | WO 2004/052646 A1 | | 6/2004 |

OTHER PUBLICATIONS

International Preliminary Report on Patentability of PCT/AU2005/001605, dated Sep. 1, 2006, four pages.

* cited by examiner

BARRIER FILM

This application is a National Stage Application of PCT/AU2005/001605, filed Oct. 18, 2005.

This invention relates to a barrier film for use in packaging to prevent gas phase transfer of carbon dioxide, oxygen and nitrogen into and out of packed products particularly solid and liquid foodstuffs.

BACKGROUND TO THE INVENTION

Keeping food and drink fresh is a significant challenge for the packaging industry. Most common packaging materials are very poor at stopping gas transfer into and out of packaged food. Over the last thirty years an industry has developed in providing barrier film layers. These films are used to stop the transfer of gases such as water vapour, $O_2$, $CO_2$ and $N_2$ into and out of food & beverages. Plastic has been used as a packaging material for over sixty years and is continuing to evolve through increasing demands from the market and through technical developments. One important requirement of many plastic packages is to keep food and drink fresh. The greatest cause of spoilage in food and drink is oxygen infiltration leading to oxidation.

The commodity plastics such as polyethylene terephthalate (PET), polypropylene (PP), polyvinyl chloride (PVC) and polyethylene (PE) all have some barrier to $O_2$ and $H_2O$. This barrier is proportional to the thickness of the barrier layer. Three factors drive the need for higher barrier performance plastics, firstly the move away from glass and tin/aluminium because of their weight, cost and breakability, secondly the down gauging of plastic materials to make them more economic and thirdly the requirement for extended shelf life as more food is packaged into ever smaller servings sizes. This has led to the development of materials that significantly enhance the barrier properties of common consumer plastic packaging.

The first successful high performance barrier material was polyvinylidene chloride (PVDC). It is a derivative of PVC and therefore is seen to have a similar negative environmental profile.

The other common barrier materials on the market today are ethylene vinyl alcohol copolymer (EVOH), nylons (e.g. MXD6) and nitrites. These are all used as a barrier layer to the structural layer provided by the commodity plastics.

The only natural polymer that has been commercialized that can be used as a barrier material is cellophane which was developed well before much of the plastics industry. Its barrier properties to oxygen are not considered high performance compared to today's barrier resins and its cost is high.

A common barrier structure of the wall of PET (polyethylene terephthalate) drink bottles is a multi-layer structure consisting of PET structural layers around a core layer or layers containing higher-priced barrier materials.

U.S. Pat. Nos. 5,498,662, 562,102, 65,897,960 and 6,143,384 disclose the use of polymethacrylic acid polymer and polysaccharides in barrier layers.

WO 00/49072 discloses barrier coatings based on clays such as montmorillonite spray coated onto PET blow moulded bottles.

USA application 2004/0087696 discloses a water based coating for PET containers in which a clay material is mixed with a melamine, formaldehyde and boric acid binder and an organic water soluble binder such as polysaccharides and cellulose materials.

Barrier materials are used in a host of different plastic structures and processes and each of these imposes its own functionality requirements. The most common use of barrier structures is in thin films for wrapping foods such as confectionery, bakery products and the plethora of pouches appearing in the market over the last five years. Some of these films can have 12 layers and yet be less than 50 μm thick. These films are typically produced through co extrusion.

WO 90/14938 discloses a high amylose modified starch that is suitable for use in oxygen barrier laminates.

U.S. Pat. Nos. 6,569,539 and 6,692,801 disclose a paper and or plastic laminate with an inner barrier coating of a starch or modified starch applied from a dispersion.

WO04/052646 discloses a multilayer barrier film using a starch layer and a biodegradable polyester layer.

USA application 2002/0187340 discloses a gas barrier coating of polyvinyl alcohol and starch in which the predominant material is starch and the material is applied from a dispersion.

Barriers are also used in bottles for fruit juice, in some carbonated soft drinks and in various hot filled foods such as fruit and vegetable preserves. Bottles are usually formed through co-injection stretch blow moulding. This requires the materials to be both injection moulded into a preform and then remelted and blown into a bottle shape. Other containers may be co-extrusion blow moulded, where the parison is blown against a mould wall to achieve the desired shape online during the co-extrusion process.

Some containers furthermore require high-gas-barrier closures, formed by means of injection moulding.

The other significant area of use of barrier materials is in rigid packages such as meat trays although for most applications the rigid plastic material provides enough barrier and only the thin film on top needs improved performance.

One issue that is seen to hold back the rollout of barrier technologies is their effect on the recyclability of the plastic—this is particularly true for the bottle market.

Many PET bottles now have a complex structure of virgin material on the exterior with recycled PET and barrier layers in the middle. If the barrier resin is not compatible with the recycling system then there is a large resistance to moving towards that technology.

Finally, new materials are entering the market, that are based on sustainable, renewable resources and/or that are biodegradable. An example of such a material that may be injection stretch blow moulded into bottles or formed into thin films for packaging applications is polylactic acid synthesised from corn. PLA is a poor gas barrier and also a relatively poor water vapour barrier and in order to preserve biodegradability or sustainability status would benefit from a biodegradable barrier based on renewable resources.

It is an object of this invention to provide a barrier film that is less expensive than prior art materials and is easy to laminate with existing packaging materials that can address the issues identified above.

BRIEF DESCRIPTION OF THE INVENTION

To this end the present invention provides a film forming barrier polymer having the composition on dry basis:
  a) from 45 to 90% by weight of a starch and/or a modified starch selected from starches modified by reaction with a hydroxyl alkyl group, an acetate or a dicarboxylic acid anhydride or a grafting polymer;
  b) from 4 to 12% by weight of a water soluble polymer selected from polyvinyl alcohol, polyvinylacetate, and copolymers of ethylene and vinyl alcohol which have a melting point compatible with the molten state of the starch components c) from 5 to 45% by weight of a non-crystallizing mixture of sorbitol and at least one other plasticizer selected from glycerol, maltitol, xylitol, mannitol, glycerol tri-oleate, epoxidised linseed or soybean oil, tributyl citrate, acetyl tri-ethyl citrate, glyceryl triacetate, 2,2,4-trim-ethyl-1,3-pentanediol diisobutyrate; polyethylene oxide or polyethylene glycol;

d) from 0.3 to 2.5% by weight of a $C_{12-22}$ fatty acid or salt;

e) from 0.25% to 3% of an emulsifier system having a hydrophilic lipophilic balance value between 2 and 10.

The formulation may contain small amounts of bound water, but only to the extent where the water does not evaporate under the processing conditions of the chosen process.

The composition defined includes formulations suitable for (co-)extruding or casting thin films potentially in a laminate structure. Other processing methods may be used including (co-)injection moulding possibly followed by blow moulding (injection-blow-moulding), (co-)extruding shapes including tubes potentially for blow moulding (extrusion-blow-moulding), and (co-)extruded and/or laminated sheet for subsequent thermoforming.

The oxygen and carbon dioxide barrier properties of the material of this invention outperforms starch-based prior art and current common commercial barrier materials. The barrier performance is at least equivalent or better than current common commercial barrier materials at elevated humidities.

The polymers of this invention are excellent oxygen barriers with an oxygen permeability coefficient below 0.1 $cm^3$ $mm/m^2$ day atm at relative humidities up to 60% RH and below 0.7 $cm^3$ $mm/m^2$ day atm at relative humidities up to 90% RH.

The polymers of this invention have a carbon dioxide permeability coefficient below 0.5 $cm^3$ $mm/m^2$ day atm at relative humidities up to 60% RH and below 0.9 $cm^3$ $mm/m^2$ day atm at relative humidities up to 90% RH.

The material may be laminated with other packaging polymers such as PET, PE, (BO)PP, LDPE and polylactic acid by co-extrusion, co-injection moulding, film blowing or thermal lamination techniques. The laminates with PET and polylactic acid are suitable for use as preforms in forming beverage bottles for soft drinks, beer or condiments. Other injection stretch blow moulded laminate products include hot fill PET or PP containers for soups juices and processed fruit. The material may be used in injection moulded PP caps or closures for oxygen and $CO_2$ barrier applications. Extrusion blow moulded PE bottles for food and pharmaceutical applications may also contain a co-extruded film of this invention. The laminates with PE, PP, BO-PP and polylactic acid (PLA) are suitable for use in thin film packaging applications such as snack wraps or thin film lids for modified atmosphere packaging of products such as meat. Adhesion is excellent with polar materials such as PET, whereas for adhesion with non-polar materials such as PP common tie layer resins are indicated. Suitable tie layer materials include grafted polymers based on PP, EVA, LDPE or LLDPE.

Because the barrier film of this invention is biodegradable and water soluble it is suitable for use with recyclable plastics. For example it is suitable for use with PET because it dissolves in the caustic wash process used in the recycling of PET. It Is suitable for use with PLA because it is compostable and will biodegrade at least as fast as PLA.

Modified Hi-amylose Starch

The upper limit to the content of the modified starch is determined by its cost. This component contributes structural benefits to the resulting material, including good film-forming properties, good optical properties, and resistance to retrogradation. Retrogradation and crystallization of starch may relate to one of the most important practical problems with starch based plastics, as they have a tendency to become brittle over time, analogous to the staling process in baked goods.

Typical modified starches include those having an hydroxyalkyl $C_{2-6}$ group or starch modified by reaction with a dicarboxylic acid anhydride. A preferred component is hydroxypropylated amylose. Other substituents can be hydroxyethyl or hydroxybutyl to form hydroxyether substitutions, acetates or anhydrides such acetic, maleic, phthalic or octenyl succinic anhydride can be used to produce ester derivatives.

The degree of substitution [the average number of hydroxyl groups in a unit that are substituted] is preferably 0.05 to 2.

The preferred starch is a high amylose maize starch. A preferred component is a hydroxypropylated high amylose starch A939 marketed by Penford Australia. The minimum level of hydroxypropylation used is 6.0%. Typical values are 6.1 to 6.9%. For cost saving reasons and for property optimisation reasons one may substitute part of this starch with:

1) Higher or lower levels of hydroxypropylation
2) A higher level of unmodified starch. This may be possible if the level of hydroxypropylation of the modified starch is increased;
3) A starch modified with octenyl succinic anhydride (OSA), which has a higher degree of hydrophobicity. The addition of this modified starch increases water resistance with increasing degree of substitution. This is relevant when the starch-polymer is incorporated as a barrier layer in packaging applications containing fluids, as the relative humidity may be up to 90%. The acetyl linkages in the OSA starch ensure that the material retains biodegradability upon access to water and a biologically active environment.
4) A starch co-polymer, preferably consisting of a styrene butadiene grafted with starch. This material improves impact resistance of the product.

Starch

The amount of unmodified starch in the composition is limited by the required addition levels of all the other ingredients: it makes up the balance. This may be derived from wheat, maize, potato, rice, oat, arrowroot, and pea sources. Unmodified starch is a cheap biodegradable raw material from renewable resources that contributes to the barrier properties of the final product, therefore highly attractive for this application. However, its use is limited by the occurrence of retrogradation (crystallisation resulting in brittleness), limited optical clarity of the resulting formed products, limited film-forming properties and limited elasticity for stretching. High-amylose starch is less sensitive to retrogradation as this phenomenon is found to be predominantly associated with the crystallization of amylopectin in cooked starch. A preferred concentration range for unmodified starch as a fraction of the total amount of starch is 0 to 50%.

Water-soluble Polymers

The polymer component b) of the composition is preferably compatible with starch, water soluble and has a melting point compatible with the processing temperatures for starch. Polyvinyl alcohol is the preferred polymer but polymers of ethylene-vinyl alcohol, ethylene vinyl acetate or blends with polyvinyl alcohol may be used.

Water solubility of the selected polymer should preferably not occur at room temperature conditions. PVOH offers a combination of excellent film forming and binder characteristics, good elasticity and aids processing of starch-based formulations. PVOH is produced by the hydrolysis of poly vinylacetate which is made by the polymerization of vinyl acetate monomer. The fully hydrolyzed grades contain few, if any, residual acetate groups; while partially hydrolyzed grades retain some of the residual acetate groups. Fully hydrolyzed grades dissolve in hot (200° F.) water, and remain in solution when cooled to room temperature. Preferred grades of PVOH include DuPont Elvanol 71-30 and Elvanol 70-62. Their properties are listed in Table 1.

TABLE 1 properties of PVOH grades used in this invention

| Grade | 71-30 | 70-62 |
|---|---|---|
| Weight Average MWt | 93,700 | 107,000-112,000 |
| Intrinsic viscosity (mPa · s) | 27-33 | 58.0-68.0 |
| Hydrolysis (%) | 99.0-99.8 | 99.4-99.8 |

The higher molecular weight grade appears to improve impact resistance and to reduce water sensitivity. The maximum level is mainly determined by costs. Increasing the level of PVOH significantly increases elongation at break and decreases Young's modulus. Film forming becomes difficult below 6%. Therefore, a preferred concentration range for thin film barrier material is 7 to 12% and the preferred concentration range for barrier materials to be applied in injection-blow moulded bottles is 4% to 12%.

Polyol Plasticisers

A range of plasticizers and humectants are useful in this formulation, in order to aid processing and control and stabilize the mechanical properties of the barrier material, in particular in reducing dependency on moisture content and RH. The desired plasticizer content depends primarily on the required processing behaviour during the (co)-extrusion or (co)-injection moulding process and subsequent blowing or stretching processes as well as on the required mechanical properties of the end product.

Cost and food contact are important issues in choosing the appropriate plasticizer. The preferred plasticizer is a mixture of polyols, in particular sorbitol, and one or more other polyols particularly glycerol, maltitol, mannitol and xylitol, although erythritol, ethylene glycol and diethylene glycol are also suitable. The plasticizer plays a triple role:

1. it provides suitable rheology for the extrusion compounding process and for the lamination process.
2. it positively affects the mechanical properties of the product and
3. it may act as an anti-retrogradation or anti-crystallizing agent.

The preferred plasticizer content is 10-40% depending on the particular application and co-extrusion or lamination process.

Sorbitol, Glycerol and Maltitol blends are particularly suitable for modifying the mechanical properties of the formulation, as is Xylitol and blends of Xylitol with Sorbitol and Glycerol. The larger the number of OH groups, the more effective the plasticiser is in reducing crystallisation. Sorbitol. Maltitol and Xylitol are particularly good humectants. Glycerol helps dissolve the PVOH during processing. Crystallisation is observed when Sorbitol is used on its own. Some polyols (Sorbitol and Glycerol in particular) may exhibit migration to the surface, where either an opaque crystalline film may form in the case of Sorbitol, or an oily film in the case of Glycerol. Blending various polyols inhibits this effect to varying degrees. Stabilisation may be enhanced with the addition of glycerol monostearate and sodium stearoyl lactylate as emulsifiers. Furthermore, synergistic effects with salt result in stronger effects on mechanical properties.

Other Plasticizers

PEG compounds may be used as emulsifying agents, plasticizers or humectants. Polyethylene oxide and polyethylene glycol alternately or together may also provide an increased water resistance, to prevent swelling which may result in delamination in multi-layer structures (MLS).

An alternative plasticiser is epoxidized linseed oil or epoxidized soybean oil. Being hydrophobic these additives may improve moisture sensitivity of the material. These plasticisers, preferably stablilized with an emulsifying system (see section below) aids processing but does not result in a significant further reduction in Young's modulus. Other plasticizers more commonly used in the PVC industry may be suitable, including tributyl citrate, 2,2,4 trimethyl-1,3-pentanediol diisobutyrate, and acetyl tri-ethyl citrate.

One may use from 0 to 20% of a humectant or water binding agent or gelling agent which may act as a (co)plasticiser such as carrageenan, xanthan gum, gum arabic, guar gum or gelatine. Other humectants may be used such as sugar or glucose. Biopolymers such as carrageenan, typically used in food products as thickeners and partially soluble in cold water, fully soluble in hot water, are suitable to tailor mechanical properties. By binding water these components may have a significant plasticizing function. Gelatine may be added to improve the mechanical properties and reduce moisture sensitivity. Xanthan Gum has a high water holding capacity and also acts as an emulsifier and in starch compositions has an anti-retrogradation effect. Gum Arabic may also be used as a texturiser and film former, and the hydrophilic carbohydrate and hydrophobic protein enable its hydrocolloid emulsification and stabilization properties. Guar gum has similar anticrystallisation effects in starch compositions. Another suitable humectant is glyceryl triacetate.

Salts

Plasticisation and humectant effects may be obtained or enhanced with salts such as sodium chloride and sodium hydroxide. Potassium salt, potassium acetate, calcium oxide and sodium iodide are also suitable. Calcium salt improves the rigidity and size stability of extruded starch materials, and may furthermore be used in combination with carrageenan to assist gelling.

Fatty Acids and Fatty Acid Salts

Stearic acid is used as a lubricating agent because it has shown better compatibility with starches than for example waxes. Stearic acid is hydrophobic and may therefore improve moisture sensitivity of the starch-based material. As well as stearic acid, the salts such as calcium stearate may be used. The stearic acid migrates to the surface of starch-based polymers. It is thought that starch may form complexes with fatty acids. The starch glucopyraniside (glucose) is a six-membered ring in the "chair" configuration. The perimeter of the ring is hydrophilic, while the faces are hydrophobic. The starch chain forms a helix, with about six residues per turn. The result is a hollow cylinder with a hydrophilic outer surface and a hydrophobic inner surface. The inner space is about 4.5 Å in diameter and straight chain alkyl molecules like stearic acid can fit into it. In the same manner, the fatty acid part of emulsifiers such as GMS can form a complex with gelatinized starch, retarding starch crystallization, thereby slowing the process of staling. The amount of monoglyceride that complexes with amylose (the linear component in starch)

and with amylopectin (the branched component in starch), is dependent upon the degree of saturation of the fatty acid portion of the emulsifier. Unsaturated fatty acids have a bend produced by the double bond in the fatty acid chain that limits their ability to form a complex.

Stearic acid is particularly useful as a processing aid, however in the presence of PEO or PEG it may not be necessary. Preferred levels of stearic acid are 0.5% to 1.5%. Sodium and potassium salts of stearic acid may also be used. Again cost can be a factor in the choice of this component but lauric, myristic, palmitic, linoleic and behenic acids are all suitable. The choice of appropriate processing aid is largely limited by the required resistance to delamination in MLS.

Thermal Stabilisers

Sulfiting agents (sulfur dioxide, sodium sulfite, sodium and potassium bisulfites and metabisulfites) are added to many foods to prevent enzymatic and nonenzymatic browning and act as antioxidants or reducing agents. Sulfites inhibit nonenzymatic browning by reacting with carbonyl intermediates, thereby preventing their further reaction to form brown pigments. Citric acid, often in conjunction with ascorbic acid or sodium bisulfite, has long been used as a chemical inhibitor of enzymic browning. A preferred concentration of potassium bisulfite for applications where browning is undesirable is up to 2%, possibly in conjunction with up to 2% ascorbic acid. Citric acid has been shown not to be of benefit at levels above 1%.

Emulsifiers

The emulsifier is preferably a food grade emulsifier and assists in maintaining the lipid and hydrophilic components homogenously dispersed in the composition. Typically the selection is dependent on the HLB (hydrophilic lipophilic balance) value. The preferred emulsifiers are selected from food grade emulsifiers with HLB numbers between 2 and 10 and include Propylene glycol monostearate, Glycerol monoleate, Glycerol trioleate, Glycerol monostearate, Acetylated monoglycerides (stearate), Sorbitan monooleate, Propylene glycol monolaurate, Sorbitan monostearate, Calcium stearoxyl-2-lactylate, Glycerol monolaurate, Sorbitan monopalmitate, Soy lecithin, Diacetylated tartaric acid esters of monoglycerides, Sodium Stearoyl lactylate, Sorbitan monolaurate. Sodium Stearoyl Lactylate and Glycerol Monostearate are commonly used in starch systems.

TABLE 2

Hyrophobic/Hydrophilic Balance (HLB) Values for some Emulsifiers

| Emulsifier | HLB Value |
|---|---|
| Sodium Stearoyl Lactylate (SSL) | 21.0 |
| Polysorbate 80 (Sorbitan Monooleate) | 15.4 |
| Polysorbate 60 (Sorbitan Monostearate) | 14.4 |
| Sucrose Monostearate | 12.0 |
| Polysorbate 65 (Sorbitan Tristearate) | 10.5 |
| Diacetyl Tartaric Ester of Monoglyceride (DATEM) | 9.2 |
| Sucrose Distearate | 8.9 |
| Triglycerol Monostearate | 7.2 |
| Sorbitan Monostearate | 5.9 |
| Succinylated Monoglyceride (SMG) | 5.3 |
| Glycerol Monostearate (GMS) | 3.7 |
| Propylene Glycol Monoester (PGME) | 1.8 |

Glycerol Monostearate is a lipophilic, non-ionic surfactant, which is particularly suitable for this application as it has a defoaming effect and anti-retrogradation effect in starch compositions. Glycerol monostearate added at levels ranging from 1-1.5% acts as an emulsifier to stabilise mechanical properties and increase homogeneity of the blend. Sodium Stearoyl Lactylate at 0.25% to 1.5% may be added to a plasticiser system to stabilise mechanical properties and increase homogeneity of the blend. Stearoyl Lactylate (as the sodium or calcium salt) is also commonly used as a dough strengthener and may hence act as an anti-retrogradation agent. Combinations of glycerol monostearate and sodium stearoyl lactylate result in faster stabilisation of properties. The HLB value follows the additive rule and is of order 4 to 10 for a suitable mixture of SSL and GMS.

Water

Water is added for the purpose of "gelatinising" (also called destructurising or melting) the starch into a polymeric gel structure. Water also may act like a plasticiser in the end-product in that it softens the material or reduces the modulus. The moisture content of the barrier material may vary at water activities or relative humidities (RH) below 30% or superior to 75%. In many barrier film and barrier bottle applications, the local RH to which the barrier material is exposed may reach values of up to 90%. For stable mechanical, lamination, and barrier properties and for ease of processing at all temperatures, non-volatile plasticizers are preferred. Therefore some or all of the water may be dried off during or after the compounding stage and/or in the feeding stage of the subsequent injection moulding or film forming. This may be achieved with venting the extruder barrel, and/or on-line drying of the pellets. Any remaining water should be suitably bound with the aid of humectants to avoid foaming during the process, or significant changes in mechanical properties in use. Extrusion processing of unplasticized formulations is possible with free water concentrations as low as 10% and formulations with Polyol plasticizers may be dried to 0% free water before injection moulding. The preferred free moisture content is the equilibrium moisture content of the formulation at the in-use RH range of the end product as determined by moisture desorption experiments. This depends on the specific composition of the formulation but is in the range of 0-3%.

DETAILED DESCRIPTION OF THE INVENTION

The barrier material (either for thin films or for co-injection moulding) of this invention is preferably formed from a starch polymer composition of the formula set out in table 1.

TABLE 1 preferred composition on dry basis. May contain 0-3% moisture.

| Hydroxypropylated high amylose starch | Sorbitol | PVOH | Other plasticisers | Stearic Acid | GMS | Stearoyl sodium lactylate |
|---|---|---|---|---|---|---|
| 48.3% | 27.4% | 9.6% | 12.8% | 0.6% | 1% | 0.25% |

EXAMPLE 1

A formulation consisting of 48.3% hydroxypropylated high-amylose corn starch, 27.4% sorbitol, 9.6% polyvinyl alcohol, 7.7% maltitol, 5.1% glycerol, 1% GMS, 0.6% stearic acid, 0.3% sodium stearoyl lactylate.

EXAMPLE 2

A formulation consisting of 64.1% hydroxypropylated high-amylose corn starch, 12.8% polyvinyl alcohol, 11.7% sorbitol, 5% glycerol, 3.3% maltitol, 1% GMS, 0.8% stearic acid, 0.3% sodium stearoyl lactylate.

EXAMPLE 3

A formulation consisting of 52.0% hydroxypropylated high-amylose corn starch, 35.1% glycerol, 11.0% polyvinyl alcohol, 1% GMS, 0.7% stearic acid, 0.3% sodium stearoyl lactylate.

EXAMPLE 4

A formulation consisting of 53.0% hydroxypropylated high-amylose corn starch, 34% xylitol, 11.2% polyvinyl alcohol, 1% GMS, 0.7% stearic acid, 0.3% sodium stearoyl lactylate.

EXAMPLE 5

A formulation consisting of 52.0% hydroxypropylated high-amylose corn starch, 35.0% sorbitol, 11.0% polyvinyl alcohol, 1% GMS, 0.7% stearic acid, 0.3% sodium stearoyl lactylate.

EXAMPLE 6

A formulation consisting of 52.0% hydroxypropylated high-amylose corn starch, 35.0% erythritol, 11.0% polyvinyl alcohol, 1% GMS, 0.7% stearic acid, 0.3% sodium stearoyl lactylate.

EXAMPLE 7

A formulation consisting of 51.9% hydroxypropylated high-amylose corn starch, 20.2% glycerol, 10.8% polyvinyl alcohol, 10.1% maltitol, 5.0% sorbitol, 1% GMS, 0.7% stearic acid, 0.3% sodium stearoyl lactylate.

EXAMPLE 8

A formulation consisting of 53.3% hydroxypropylated high-amylose corn starch, 18.4% glycerol, 12.5% polyvinyl alcohol, 8.1% maltitol, 5.4% sorbitol, 1.1% GMS, 0.8% stearic acid, 0.3% sodium stearoyl lactylate.

EXAMPLE 9

A formulation consisting of 54.9% hydroxypropylated high-amylose corn starch, 18.7% glycerol, 10.0% polyvinyl alcohol, 8.3% maltitol, 5.5% sorbitol, 0.9% GMS, 0.5% stearic acid, 0.23% sodium stearoyl lactylate.

EXAMPLE 10

A formulation consisting of 66.5% hydroxypropylated high-amylose corn starch, 13.1% glycerol, 7.6% polyvinyl alcohol, 5.8% maltitol, 3.9% sorbitol, 1.7% GMS, 1.1% PEO, 0.5% stearic acid.

EXAMPLE 11

A formulation consisting of 66.5% hydroxypropylated high-amylose corn starch, 11.0% glycerol, 7.6% polyvinyl alcohol, 9.2% sorbitol, 2.6% maltitol, 1.7% GMS, 1.1% PEO, 0.5% stearic acid.

EXAMPLE 12

A formulation consisting of 50% hydroxypropylated high-amylose corn starch, 20% glycerol, 10.3% polyvinyl alcohol, 10% maltitol, 5% sorbitol, 1% GMS, 0.26% sodium stearoyl lactylate, 1.1% potassium bisulfite, 1.1% ascorbic acid, 0.7% stearic acid, 0.5% citric acid.

EXAMPLE 13

A formulation consisting of 47.2% hydroxypropylated high-amylose corn starch, 20% glycerol, 10% polyvinyl alcohol, 10% maltitol, 5% sorbitol, 5% citric acid, 0.9% GMS, 0.23% sodium stearoyl lactylate, 1% potassium bisulfite, 0.1% ascorbic acid, 0.6% stearic acid.

EXAMPLE 14

A formulation consisting of 50.9% hydroxypropylated high-amylose corn starch, 20.5% glycerol, 10.8% polyvinyl alcohol, 10.3% maltitol, 5.1% sorbitol, 1% GMS, 0.7% stearic acid, 0.5% citric acid, 0.24% sodium stearoyl lactylate, 0.1% ascorbic acid, 0.01% potassium bisulfite.

EXAMPLE 15

A formulation consisting of 47.2% hydroxypropylated high-amylose corn starch, 20.2% glycerol, 9.7% polyvinyl alcohol, 10.1% maltitol, 5% sorbitol, 4.96% citric acid, 1% ascorbic acid, 0.9% GMS, 0.6% stearic acid, 0.22% sodium stearoyl lactylate, 0.01% potassium bisulfite.

Barrier Properties

TABLE 2

Oxygen permeability at 20-25° C. of selected formulations of this invention compared to literature data for commercial polymers and barrier materials

| Material grade name | RH (%) | P ($cm^3$ mm/$m^2$ day atm) average (stdev) | Source |
|---|---|---|---|
| PET | 0%-90% | 1.2-2.4 | [1] |
| PET | 0% | 2.2-3.8 | [2] |
| PP | 0-100% | 53-100 | [1] |
| PP | 0-100% | 58-99 | [2] |
| EVOH Eval-E | 0% | 0.02 | [1] |
| EVOH Eval-E | 100% | 0.477 | [1] |
| EVOH Eval-F | 0% | 0.01 | [1] |
| EVOH Eval-F | 100% | 0.776 | [1] |
| EVOH Eval-L | 0% | 0.0024-0.005 | [1] |

TABLE 2-continued

Oxygen permeability at 20-25° C. of selected formulations of this invention compared to literature data for commercial polymers and barrier materials

| Material grade name | RH (%) | P (cm³ mm/m² day atm) average (stdev) | Source |
|---|---|---|---|
| EVOH Eval-L | 100% | 1.036 | [1] |
| Nylon MXD6 | 0% | 0.06-0.07 | [1] |
| Nylon MXD6 | 90% | 0.32 | [1] |
| Nylon MXD6 | 100% | 1.055 | [1] |
| WO 90/14938 formulas 1-4 | 11% | 0.657 | [3] |
| WO 90/14938 formulas 1-4 | 52% | 1.96-7.22 | [3] |
| WO 90/14938 formulas 1-4 | 75% | 131-460 | [3] |
| This invention | 30-35% | 0.013-0.042 | [4] |
| This invention | 50% | 0.0085-0.039 | [4] |
| This invention | 60% | 0.037-0.079 | [4] |
| This invention | 85% | 0.0273 (0.0044) | [4] |

[1] "Permeability and other film properties of plastics and elastomers," Plastics Design Library, 1995
[2] "Plastics Packaging", Hernandez Selke and Culter ed., Hanser Verlag
[3] WO 90/14938 (Permeability quoted in ml (STP) cm × 1010/cm2 s cmHg)
[4] Mocon Ox-Tran 2/21 tests carried out by independent laboratories The permeability to oxygen of selected formulations of this invention are listed in Table 2, compared to common packaging materials and barrier materials for packaging purposes.

Figure 2:
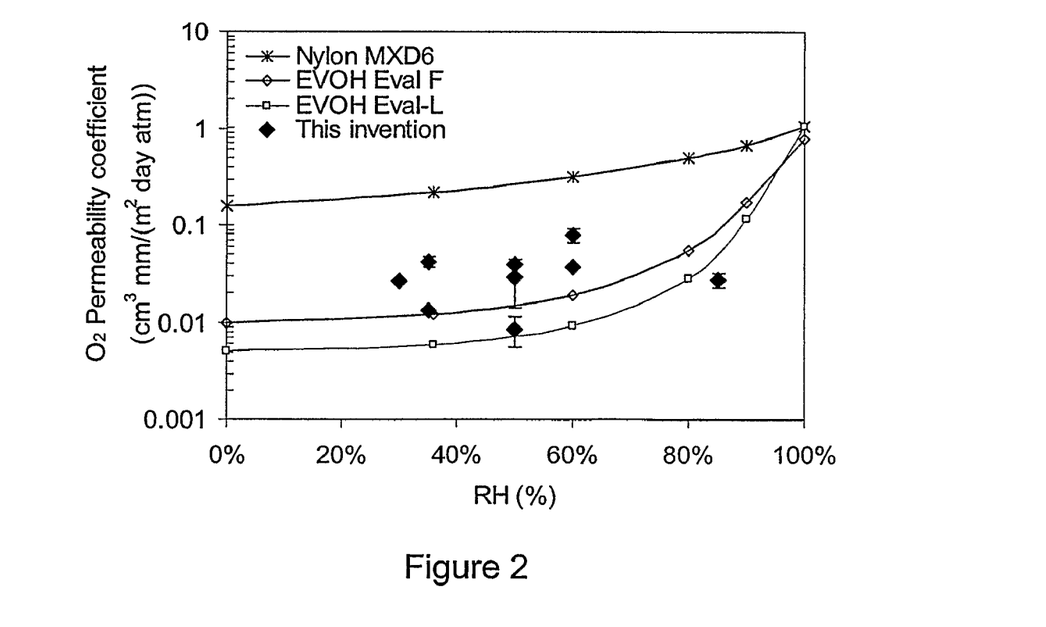
FIG. 2: Relative humidity dependence of oxygen permeability of the barrier material of this invention compared to EVOH and MXD6.

The dependence on relative humidity of formulations of this invention is graphed in FIG. 2. The formulations of this invention are equivalent to EVOH and at high humidities outperform both EVOH and MXD6. This is of particular relevance for drinks applications, where inside the bottle wall the local humidity is of order 80-90%.

The main components contributing to the barrier performance of this invention are starch, in particular the chemically modified high amylose starch, and PVOH. The polyol plasticizers also contribute to the barrier properties.

Figure 3:
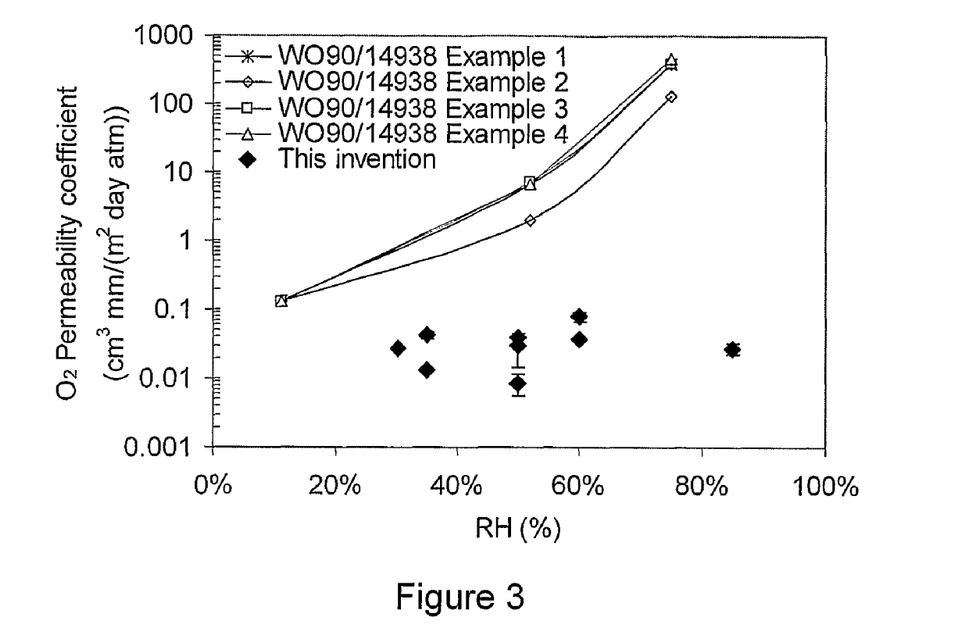
FIG. 3: Relative humidity dependence of oxygen permeability of the barrier material of this invention compared to starch films of patent WO 90/14938.

Table 2 and FIG. 3 shows that the formulations of this invention significantly outperform the oxygen barrier obtained for the high-amylose starch films described in WO 90/14938. Synergistic effects of the components, as well as any complexes that may be formed by these components in the extrusion process, may assist in significantly enhancing the oxygen barrier of the polymeric material of this invention.

TABLE 3

Carbon Dioxide permeability at 20-25° C. of selected formulations of this invention compared to literature data for commercial polymers and barrier materials

| Material grade name | RH (%) | P (cm³ mm/m² day atm) average (stdev) | Source |
|---|---|---|---|
| PET | 0% | 4.7-9.8 | [1] |
| PET |  | 8-20 | [2] |
| PP | 0% | 208 | [1] |
| PP |  | 213 | [2] |
| EVOH Eval-E | 0% | 0.251 | [1] |
| EVOH Eval-E | 90% | 0.886 | [1] |
| EVOH Eval-E | 100% | 3.117 | [1] |
| EVOH Eval-F | 0% | 0.026 | [1] |
| EVOH Eval-F | 90% | 1.432 | [1] |
| EVOH Eval-F | 100% | 8.230 | [1] |
| Nylon MXD6 | 0% | 0.61 | [3] |
| This invention | 35% | 0.297 (0.054) | [4] |
| This invention | 50% | 0.134 (0.047) | [4] |
| This invention | 85% | 0.547 (0.119) | [4] |
| This invention | 90% | 0.823 (0.194) | [4] |

Figure 4:
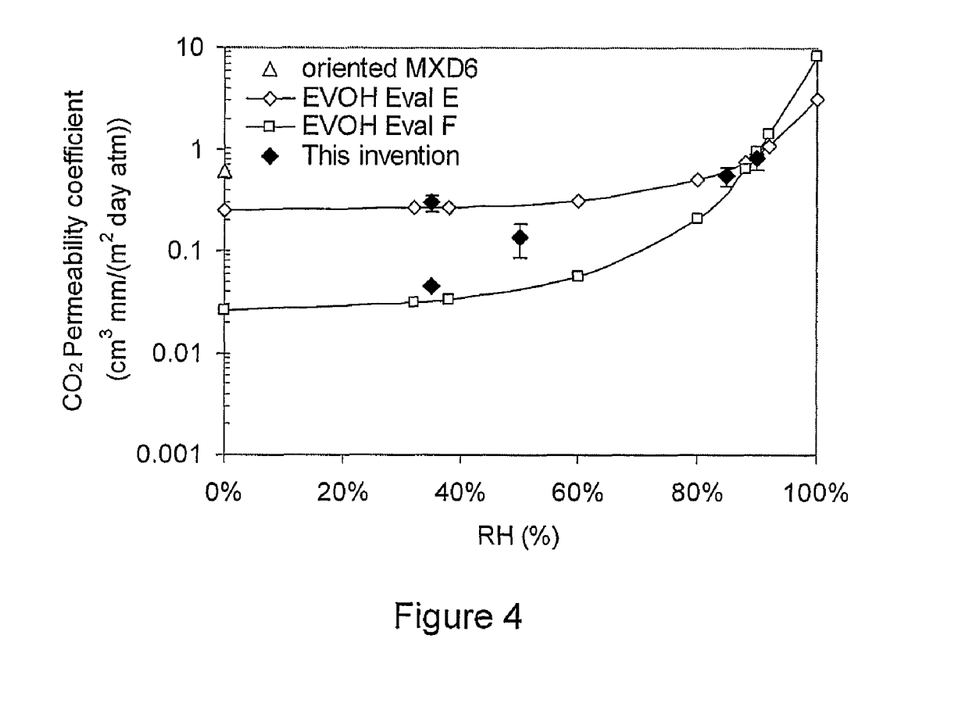
FIG. 4: Relative humidity dependence of carbon dioxide permeability of the barrier material of this invention compared to EVOH and MXD6.

[1] "Permeability and other film properties of plastics and elastomers," Plastics Design Library, 1995
[2] "Plastics Packaging", Hernandez Selke and Culter ed., Hanser Verlag
[3] Hu et al, Polymer 46 (2005) 2685-2698
[4] Mocon Oxtran tests carried out by independent laboratories Table 3 shows the carbon dioxide barrier of the formulations of this invention, and FIG. 4 shows the humidity dependence of the performance. The barrier performance is equivalent to EVOH grades commonly used in commercial packaging applications.

Optical Properties

The barrier layers of this invention are transparent and are ideally suited for multi-layer packaging items that allow visibility of the product. The optical properties of the barrier material of this invention were measured on a 250 micron sheet, and resulted in a haze of 8-10% (ASTM D1003-00), light transmission of 85-95% (ASTM D1746-92) and a 60° specular gloss of 84.7% (ASTM D2457-97). As the film tested was 10 times the thickness of the barrier layer applied, this barrier material achieves the required optical properties for a barrier layer of 20-40 micron thickness in PET soft drink bottles, namely light transmission superior to 90% and a haze inferior to 3% and yellowing characterized by a lab b* reading inferior to 2. EVOH-F at a 15 micron thick layer has a haze of 1.5%, PET at 12-14 micron has a haze of 2.5-3.9%. PP at 20 to 22 micron has a haze of 2.2-3.5%.

Manufacturing Method

The material is manufactured by means of extrusion compounding, using co- or counter-rotating twin screw or selected design single screw extruders. The preferable process is twin screw co-rotating compounding, with an extrusion pressure of at least 10 Bar and with a screw speed of at least 100 RPM. Water may be added to the process (by means of liquid injection together with the plasticizers) dependent on the level and nature of other plasticizers. Removal of water may be carried out by means of convective drying, contact heating, IR heating, or microwave drying for the extrudate strands, a centrifuge and a fluidised bed for granulate, or barrel venting or a combination of these. Granulate may be obtained by means of underwater pelletising, die face cutting or strand cooling and cutting.

Processibility in Single or Multi Layer Conversion Processes

Rheological Compatibility for Multilayer Applications

Figure 1:
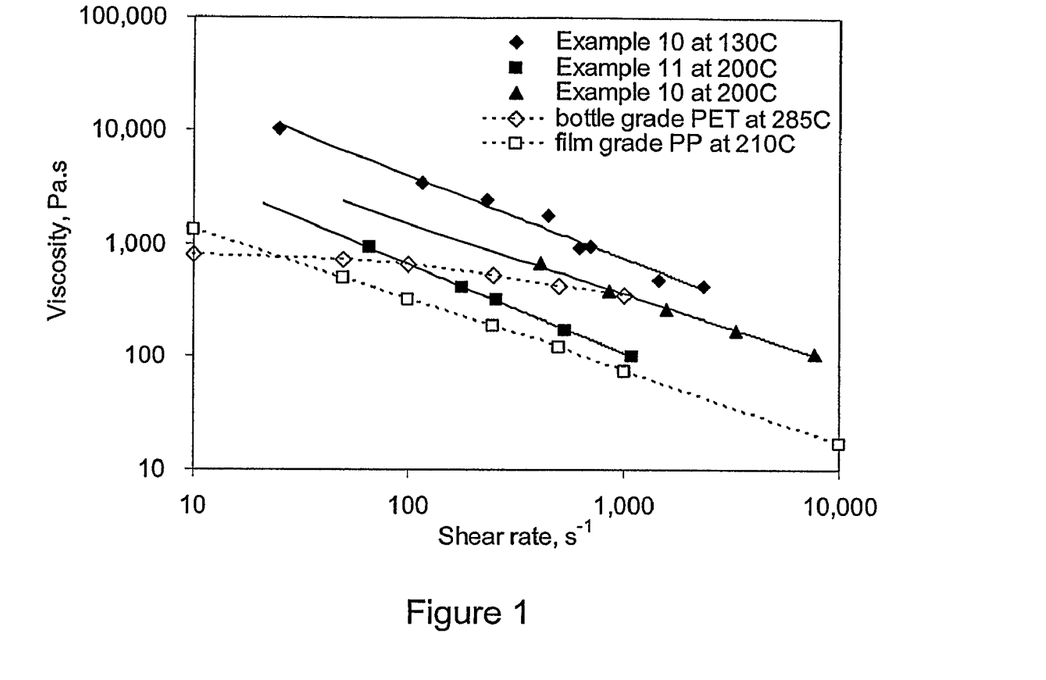
FIG. 1: Shear rate dependence of the viscosity of selected formulations of this invention compared to bottle grade PET and film grade PP.

The viscosity dependence on shear rate of several formulations of this invention, are shown in FIG. 1, compared to a thin film grade Polypropylene and a bottle grade PET at their respective processing temperatures. The viscosity curve can be adjusted by altering the type and level of plasticizer to achieve compatibility with the other polymers in the co-extrusion process. This is illustrated by the differences in the viscosity curve between Example 10 and 11. The viscosity curves of these two examples are quite different, despite the only formula difference being the proportions of sorbitol and maltitol. In addition different barrel temperatures may aid viscosity modification as illustrated in FIG. 1 for Example 10 at barrel temperatures of 130° C. versus barrel temperatures of 200° C. The viscosity curve of example 11 is particularly compatible with that of PP making it suitable for film co-extrusion using a feed block.

Co-injection Stretch Blow Moulding with PET

Thermal Stability

Thermal resistance of the dried formulations was investigated by means of DSC as well as by convective oven experiments to assess the foaming and/or browning of the formulations. Table 4 illustrates the observed thermal stability of a range of formulations of this invention. Formulations with a higher level of sorbitol or xylitol were found to be the most thermally stable, followed by formulations with high levels of glycerol. Formulations with high maltitol levels are less thermally stable. The addition of potassium bisulfite and ascorbic acid together significantly retarded thermal degradation, whereas the addition of citric acid with ascorbic acid caused browning over time even at room temperature. Citric acid in the presence of potassium bisulfite also caused browning at a lower temperature than formulations without either, but not as early or severe as in the presence of ascorbic acid. The use of humectant plasticizers aids in the suppression of water evaporation for these undried formulas. Therefore partially dried formulations plasticized with humectant plasticizers do not exhibit any foaming even at the high nozzle temperatures used in PET co-injection moulding.

TABLE 4

| Formulation | Degradation T DSC [1] (° C.) | Degradation T DSC [2] (° C.) | Browning T (° C.) [3] | Bubbles 200° C. [4] |
|---|---|---|---|---|
| Example 7 | 245-295 | 270-310 | 170 | Yes |
| Example 4 | 275-325 | 300-340 | 180 | Little |
| Example 5 | 280-305 | 300-350 | 185 | None |
| Example 3 | | 280 | 180 | Little |
| Example 8 | | 270 | | |
| Example 12 | | 290 | 185 | Yes |

[1] TA Instruments Q100 with Intercooler (−70° C. to 400° C. range) controlled by Q Advantage v 2.1.0.240 (Release 4.1.0) software. Post processing using Universal Analysis 2000 v 4.2E Build 4.2.0.38. Ramp 20° C./min.
[2] Perkin-Elmer DSC-7 (Heat at 10° C./min from 50° C. to 350° C.)
[3] Short term (1 minute ramp and 20s constant) exposure to convective heat and air in Perkin Elmer HB43 moisture balance; undried formulas.
[4] Long term exposure to convective heat and air in Perkin Elmer HB43 moisture balance.

Co-injection

The material may be injection moulded using conventional screw driven or injection driven processes with hot or cold runner systems. The formulations of this invention have been designed to be compatible with PET for co-injection moulding at elevated temperatures. A range of formulations of this invention have been successfully co-injection moulded on a Husky IN-90 preform index machine with a 99 tons clamp force, with a 4-cavity mould making 28 g preforms. The "A" extruder was a standard 45 mm RS PET screw; the "B" screw was an 18 mm RS screw, with a shut-off nozzle, used for the barrier material of this invention. The cold half of the preform mould was a standard design. The hot half was a special design.

The two materials were conveyed in separate manifolds, and combined in the nozzle to form an annular flow pattern. There was separate temperature control of each manifold, with good thermal separation. The nozzle is the only part of the manifold system where both material streams must be at the same temperature. This temperature is typically around 250-280° C., to suit the requirements of PET. Materials were dried as required in standard industry de-humidifying driers.

Formulations with high levels of sorbitol, low levels of maltitol, or with potassium bisulfite are sufficiently thermally stable for co-injection with PET. Table 5 show typical processing conditions for the co-injection process as used for Examples 1, 7, 8 and 9.

TABLE 5 processing conditions for a typical 28 g perform for a ½ l bottle.

| | Cycle (s) | Shot size (mm$^3$) | Inject speed (mm/s) | Temperatures (°C.) | | | Pressure (Bar) | |
|---|---|---|---|---|---|---|---|---|
| | | | | Barrel | Manifold | Nozzle | Injection | Back |
| A | 15-30 | 44 | 45 | 210-290 | 270-290 | 250-300 | 40-80 | 1-5 |
| B | | 75 | 22 | 80-220 | 160-220 | | 20-100 | 1-5 |

Bottle Blowing

Formulations of this invention may be readily blown into bottles on conventional stretch blow moulding lines. Preforms with a barrier layer made of Example 1 and Example 9 were blown into bottles on a commercial PET stretch blow moulder with infra red heating lamps and mechanical stretch rod. Preform temperatures were in the range 100 to 120° C., and a blow moulding pressures of 35 to 45 bar were used. Output rate was 1000 bottles per hour per cavity.

Adhesion

Adhesion with PET was found to be excellent and hence significantly superior to MXD6 and EVOH, due to the polar nature of this barrier material with a surface tension of >50 dynes/cm and due to the lack of crystallinity-related shrinkage.

Mechanical Properties

A barrier layer typically makes up about 5-20% of the total layer thickness of the multilayer structure. Therefore its mechanical properties will contribute somewhat to the mechanical properties of the final properties. Where the mechanical properties of the barrier material are lower, some compensation may be required by slightly increasing the wall thickness of the container, but never by more than the barrier layer thickness, hence 10% increase at the most, offset by the advantage of excellent barrier properties at a cost saving compared to conventional barrier materials. Also important is the elongation behaviour as in the bottle blowing process the axial stretch is about 1.5× to 3.5× and the hoop stretch is about 3.5× to 5×. This stretching occurs in heated form, and the barrier layer is supported by the matrix.

The mechanical properties of this barrier material are compared to commercial materials for injection stretch blow moulding in Table 6

TABLE 6

| Property | ASTM | This invention | PET | PLA | MXD6 |
| --- | --- | --- | --- | --- | --- |
| Elastic modulus (MPa) | D638 | 20-450 | 3400-3800 | 3000-3400 | 3500-4700 |
| Tensile strength (MPa) | D638 | 7-30 | 160-190 | 90-120 | 220 |
| Elongation at break (%) | D638 | 30-340 | 100-120 | 150-170 | 2-3 |

Cast Film Extrusion

Finally this barrier material may also be used as a single layer product, with optional printing and varnishes. The resulting films could be thin, for confectionery bars or pouches, or thick, for thermoforming applications, as this material is also ideally suited for thermoforming processing.

The formulations of this invention are suitable for extrusion casting of thin films. Those skilled in the art would be able to select suitable plasticizer levels to obtain the required melt strength and mechanical properties for the required application. Selected formulations of this invention were cast into monolayer thin films using a 90mm single screw extruder at throughput rates of 70-200 kg/h through a 1050 mm wide sheet die with barrel temperatures ranging from 90-200° C. Haul off ratios of order 10-30 were used with roll speeds ranging from 10-50 m/min, resulting in some to strong mono-axial orientation.

The mechanical properties of a mono-layer thin film of this material are listed in Table 7.

TABLE 7

Mechanical properties of a 30 micron thin film of this invention

| Property | Test method | Value | Typical confectionery wrap |
| --- | --- | --- | --- |
| Strain at break (CD-MD) | ASTM D 882 | 25-30% | <190% |
| Tensile Strength (CD-MD) | ASTM D 882 | 40-70 MPa | 50-125 MPa |
| Coefficient of Friction, static | | 0.27 | 0.20-0.40 |
| Coefficient of Friction, dynamic | ASTM D 1434 | 0.22 | 0.05-0.40 |
| Notched tear resistance (MD-CD) | ASTM D 1938 | 308 mN | 50-75 mN |

The preferred compositions used in this invention are cold sealable and heat sealable.

Biaxially Oriented Film Extrusion

This barrier material can be coextruded into a laminate or combined with conventional film polymers (e.g. biaxially oriented PP) in a separate lamination step. The other materials may be any suitable packaging polymer such as polypropylene (PP) polyethylene (PE) or low density polyethylene (LDPE), or biodegradable polymers such as polylactic acid (PLA) or other polyesters.

The barrier material of this invention is preferably used as the middle layer in a three layer laminate or a 5 to 7-layer product if additional tie layers and protective coatings are deemed necessary.

In addition it could also be the internal or external layer of a two-layer packaging wrap, if water-resistance is only required on one side, or if water vapor barrier is not required for the packaged product.

Those skilled in the art would be able to select suitable plasticizer levels to obtain the required viscosity compatibility for the polymer combination of interest. In most cases a feed block is adequate for the control of the various material layers, in other cases a multi-manifold die may be more desirable.

Multilayer Compatibility

Adhesion is excellent with polar materials such as PET, whereas for adhesion with non-polar materials such as BO-PP common tie layer resins are indicated.

Suitable tie layer materials include grafted polymers based on PP, EVA, LDPE or LLDPE. For adhesion to PP Orevac PPC from Atofina is suitable for clear applications and Orevac 18729 or 18910 from Atofina for opaque applications. Other suitable tie layers include EVA copolymers, acrylic copolymers and terpolymers, ionomers, metallocene PE, ethylene acrylic ester terpolymers and ethylene vinyl acetate terpolymers. Anhydride modified polymers are also suitable for dry formulations of this invention. The barrier material is inherently antistatic, and may be printed or coated with all standard printing techniques. The adhesion with inks and coatings is excellent for solvent based inks, as determined with the tape peel test. The tear propagation resistance is (ASTM D 1938) 200-400 Nm and the kinetic coefficient of friction (ASTM D 1434) is 0.1-0.3.

Film Blowing

Much along the principles described above for multilayer biaxially oriented film extrusion, this barrier material can be co-extruded into blown film, using similar tie layer principles if required.

The formula of this invention is unique among barrier materials in that it offers better barrier properties than the most commonly used materials (e.g. MXD6) at a significantly lower costs, allowing for costs savings both in terms of the thickness of the layer and the price of the compound.

The nature of the ingredients of this barrier material ensures their price stability compared to oil-based polymers, and price competitiveness compared to MXD6, as they could be made available profitably at 80% of the price of MXD6.

Furthermore its water solubility offers excellent recyclability to the matrix materials with which this barrier is combined. If used as a single-layer structure barrier packaging, this material is furthermore compostable and biodegradable and will disintegrate and biodegrade as litter at environmental temperatures. These unique properties are due to the combination of compounds in the formula.

Those skilled in the art will realize that this invention may be implemented in a variety of ways without departing from the essential teachings of the invention.

The invention claimed is:

1. A film forming barrier polymer having the composition on dry basis:
   a) from 45 to 90% by weight of a starch and/or a modified starch selected from starches modified by reaction with a hydroxyl alkyl group, an acetate or a dicarboxylic acid anhydride or a grafting polymer;
   b) from 4 to 12% by weight of a water soluble polymer selected from polyvinyl alcohol, polyvinylacetate, and copolymers of ethylene and vinylalcohol which have a melting point compatible with the molten state of the starch components c) from 5 to 45% by weight of a non-crystallising mixture of sorbitol and at least one other plasticizer selected from glycerol, maltitol, xylitol, mannitol, glycerol trioleate, epoxidised linseed or soybean oil, tributyl citrate, acetyl tri-ethyl citrate, glyceryl triacetate, 2,2,4-trimethyl-1,3-pentanediol diisobutyrate; polyethylene oxide or polyethylene glycol;

d) from 0.3 to 2.5% by weight of a $C_{12-22}$ fatty acid or salt;

e) from 0.25% to 3% of an emulsifier system having a hydrophilic lipophilic balance value between 2 and 10.

2. A film forming barrier polymer as claimed in claim 1 wherein component b) is a polyvinyl alcohol.

3. A film forming barrier polymer as claimed in claim 1 which additionally includes a thermal stabilizer to prevent enzymatic and nonenzymatic browning.

4. A film forming barrier polymer as claimed in claim 1 which additionally includes sodium chloride, sodium hydroxide potassium salt, potassium acetate, calcium oxide or sodium iodide as a water binding or gelling agent.

5. A film forming barrier polymer as claimed in claim 1 which additionally includes from 0 to 20% of a humectant or water binding agent or gelling agent.

6. The film forming barrier polymer of claim 5, wherein said humectant, water binding agent, or gelling agent is carrageenan, xanthan gum, gum arabic, guar gum, or gelatine.

7. A film forming barrier polymer as claimed in claim 1 having an oxygen permeability coefficient below 0.1 $cm^3$ $mm/m^2$ day atm at relative humidities up to 60% RH and below 0.7 $cm^3$ $mm/m^2$ day atm at relative humidities up to 90% RH.

8. A film forming barrier polymer as claimed in claim 1 having a carbon dioxide permeability coefficient below 0.5 $cm^3$ $mm/m^2$ day atm at relative humidities up to 60% RH and below 0.9 $cm^3$ $mm/m^2$ day atm at relative humidities up to 90% RH.

9. A co-injection moulded laminate of polyethylene terephthalate or polylactic acid and the composition defined in claim 1.

10. A co-injection moulded laminate pre-form as claimed in claim 9 for blow moulding into beverage bottles.

11. A co-extruded laminate of polyethylene, polypropylene or polylactic acid with a composition as defined in claim 1.

12. A co-extruded laminate as defined in claim 11, for thin film packaging applications.

13. A film forming barrier polymer having the composition on dry basis:

a) from 45 to 90% by weight of a starch and/or a modified starch selected from starches modified by reaction with a hydroxyl alkyl group, an acetate or a dicarboxylic acid anhydride or a grafting polymer;

b) from 4 to 12% by weight of a water soluble polymer selected from polyvinyl alcohol, polyvinylacetate, and copolymers of ethylene and vinylalcohol which have a melting point compatible with the molten state of the starch components c) from 5 to 45% by weight of a non-crystallising mixture of sorbitol and at least one other plasticizer selected from glycerol, maltitol, xylitol, mannitol, glycerol trioleate, epoxidised linseed or soybean oil, tributyl citrate, acetyl tri-ethyl citrate, glyceryl triacetate, 2,2,4-trimethyl-1,3-pentanediol diisobutyrate; polyethylene oxide or polyethylene glycol;

d) from 0.3 to 2.5% by weight of a $C_{12-22}$ fatty acid or salt;

e) from 0.25% to 3% of an emulsifier system having a hydrophilic lipophilic balance value between 2 and 10 wherein a) is compatible with b) in the film forming barrier polymer.

\* \* \* \* \*